(12) United States Patent
Hogue et al.

(10) Patent No.: US 8,682,891 B2
(45) Date of Patent: **\*Mar. 25, 2014**

(54) AUTOMATIC OBJECT REFERENCE IDENTIFICATION AND LINKING IN A BROWSEABLE FACT REPOSITORY

(75) Inventors: Andrew W. Hogue, Ho Ho Kus, NJ (US); Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,354

(22) Filed: Sep. 4, 2012

(65) Prior Publication Data

US 2013/0060746 A1    Mar. 7, 2013

Related U.S. Application Data

(63) Continuation of application No. 11/356,837, filed on Feb. 17, 2006, now Pat. No. 8,260,785.

(51) Int. Cl.
*G06F 7/00* (2006.01)

(52) U.S. Cl.
USPC .......................................................... 707/726

(58) Field of Classification Search
USPC .......................................................... 707/726
See application file for complete search history.

(56) References Cited

U.S. PATENT DOCUMENTS

| | | | |
|---|---|---|---|
| 5,010,478 A | 4/1991 | Deran | |
| 5,133,075 A | 7/1992 | Risch | |
| 5,347,653 A | 9/1994 | Flynn et al. | |
| 5,440,730 A | 8/1995 | Elmasri et al. | |
| 5,475,819 A | 12/1995 | Miller et al. | |
| 5,519,608 A | 5/1996 | Kupiec | |
| 5,546,507 A | 8/1996 | Staub | |
| 5,560,005 A | 9/1996 | Hoover et al. | |
| 5,574,898 A | 11/1996 | Leblang et al. | |
| 5,675,785 A | 10/1997 | Hall et al. | |
| 5,680,622 A | 10/1997 | Even | |
| 5,694,590 A | 12/1997 | Thuraisingham et al. | |
| 5,701,470 A | 12/1997 | Joy et al. | |
| 5,717,911 A | 2/1998 | Madrid et al. | |

(Continued)

FOREIGN PATENT DOCUMENTS

| | | |
|---|---|---|
| JP | 5-174020 A | 7/1993 |
| JP | 11-265400 A | 9/1999 |

(Continued)

OTHER PUBLICATIONS

Agichtein, Snowball estracting relations from large plain-text collections, Dec. 1999, 13 pgs.

(Continued)

*Primary Examiner* — Truong Vo
(74) *Attorney, Agent, or Firm* — Morgan, Lewis & Bockius LLP

(57) ABSTRACT

Links between facts associated with objects are automatically created and maintained in a fact repository. Names of objects are automatically identified in the facts, and collected into a list of names. The facts are then processed to identifying such names in the facts. Identified names are used as anchor text for search links. A search link includes a search query for a service engine which search the fact repository for facts associated with objects having the same name.

20 Claims, 9 Drawing Sheets

(56) References Cited

U.S. PATENT DOCUMENTS

| | | |
|---|---|---|
| 5,717,951 A | 2/1998 | Yabumoto |
| 5,724,571 A | 3/1998 | Woods |
| 5,778,373 A | 7/1998 | Levy et al. |
| 5,778,378 A | 7/1998 | Rubin |
| 5,787,413 A | 7/1998 | Kauffman et al. |
| 5,793,966 A | 8/1998 | Amstein |
| 5,802,299 A | 9/1998 | Logan et al. |
| 5,815,415 A | 9/1998 | Bentley et al. |
| 5,819,210 A | 10/1998 | Maxwell, III et al. |
| 5,819,265 A | 10/1998 | Ravin et al. |
| 5,822,743 A | 10/1998 | Gupta et al. |
| 5,826,258 A | 10/1998 | Gupta et al. |
| 5,838,979 A | 11/1998 | Hart et al. |
| 5,882,743 A | 3/1999 | McConnell |
| 5,909,689 A | 6/1999 | Van Ryzin |
| 5,920,859 A | 7/1999 | Li |
| 5,943,670 A | 8/1999 | Prager |
| 5,956,718 A | 9/1999 | Prasad et al. |
| 5,974,254 A | 10/1999 | Hsu |
| 5,987,460 A | 11/1999 | Niwa et al. |
| 6,006,221 A | 12/1999 | Liddy et al. |
| 6,018,741 A | 1/2000 | Howland et al. |
| 6,038,560 A | 3/2000 | Wical |
| 6,044,366 A | 3/2000 | Graffe et al. |
| 6,052,693 A | 4/2000 | Smith et al. |
| 6,064,952 A | 5/2000 | Imanaka et al. |
| 6,073,130 A | 6/2000 | Jacobson et al. |
| 6,078,918 A | 6/2000 | Allen et al. |
| 6,112,203 A | 8/2000 | Bharat et al. |
| 6,112,210 A | 8/2000 | Nori et al. |
| 6,122,647 A | 9/2000 | Horowitz et al. |
| 6,134,555 A | 10/2000 | Chadha et al. |
| 6,138,270 A | 10/2000 | Hsu |
| 6,182,063 B1 | 1/2001 | Woods |
| 6,202,065 B1 | 3/2001 | Wills |
| 6,212,526 B1 | 4/2001 | Chaudhuri et al. |
| 6,240,546 B1 | 5/2001 | Lee et al. |
| 6,263,328 B1 | 7/2001 | Coden et al. |
| 6,263,358 B1 | 7/2001 | Lee et al. |
| 6,266,805 B1 | 7/2001 | Nwana et al. |
| 6,285,999 B1 | 9/2001 | Page |
| 6,289,338 B1 | 9/2001 | Stoffel et al. |
| 6,311,194 B1 | 10/2001 | Sheth et al. |
| 6,314,555 B1 | 11/2001 | Ndumu et al. |
| 6,327,574 B1 | 12/2001 | Kramer et al. |
| 6,349,275 B1 | 2/2002 | Schumacher et al. |
| 6,377,943 B1 | 4/2002 | Jakobsson |
| 6,397,228 B1 | 5/2002 | Lamburt et al. |
| 6,438,543 B1 | 8/2002 | Kazi et al. |
| 6,470,330 B1 | 10/2002 | Das et al. |
| 6,473,898 B1 | 10/2002 | Waugh et al. |
| 6,487,495 B1 | 11/2002 | Gale et al. |
| 6,502,102 B1 | 12/2002 | Haswell et al. |
| 6,519,631 B1 | 2/2003 | Rosenschein et al. |
| 6,556,991 B1 | 4/2003 | Borkovsky |
| 6,565,610 B1 | 5/2003 | Wang et al. |
| 6,567,846 B1 | 5/2003 | Garg et al. |
| 6,567,936 B1 | 5/2003 | Yang et al. |
| 6,572,661 B1 | 6/2003 | Stern |
| 6,584,464 B1 | 6/2003 | Warthen |
| 6,584,646 B2 | 7/2003 | Fujita |
| 6,594,658 B2 | 7/2003 | Woods |
| 6,606,625 B1 | 8/2003 | Muslea et al. |
| 6,606,659 B1 | 8/2003 | Hegli et al. |
| 6,609,123 B1 | 8/2003 | Cazemier et al. |
| 6,636,742 B1 | 10/2003 | Torkki et al. |
| 6,643,641 B1 | 11/2003 | Snyder |
| 6,665,659 B1 | 12/2003 | Logan |
| 6,665,666 B1 | 12/2003 | Brown et al. |
| 6,665,837 B1 | 12/2003 | Dean et al. |
| 6,693,651 B2 | 2/2004 | Biebesheimer et al. |
| 6,704,726 B1 | 3/2004 | Amouroux |
| 6,738,767 B1 | 5/2004 | Chung et al. |
| 6,745,189 B2 | 6/2004 | Schreiber |
| 6,754,873 B1 | 6/2004 | Law et al. |
| 6,799,176 B1 | 9/2004 | Page |
| 6,804,667 B1 | 10/2004 | Martin |
| 6,820,081 B1 | 11/2004 | Kawai et al. |
| 6,820,093 B2 | 11/2004 | de la Huerga |
| 6,823,495 B1 | 11/2004 | Vedula et al. |
| 6,832,218 B1 | 12/2004 | Emens et al. |
| 6,845,354 B1 | 1/2005 | Kuo et al. |
| 6,850,896 B1 | 2/2005 | Kelman et al. |
| 6,873,982 B1 | 3/2005 | Bates et al. |
| 6,886,005 B2 | 4/2005 | Davis |
| 6,886,010 B2 | 4/2005 | Kostoff |
| 6,901,403 B1 | 5/2005 | Bata et al. |
| 6,904,429 B2 | 6/2005 | Sako et al. |
| 6,957,213 B1 | 10/2005 | Yuret |
| 6,963,880 B1 | 11/2005 | Pingte et al. |
| 6,965,900 B2 | 11/2005 | Srinivasa |
| 7,003,506 B1 | 2/2006 | Fisk |
| 7,003,522 B1 | 2/2006 | Reynar et al. |
| 7,003,719 B1 | 2/2006 | Rosenoff et al. |
| 7,007,228 B1 | 2/2006 | Carro |
| 7,013,308 B1 | 3/2006 | Tunstall-Pedoe |
| 7,020,662 B2 | 3/2006 | Boreham et al. |
| 7,043,521 B2 | 5/2006 | Eitel |
| 7,051,023 B2 | 5/2006 | Kapur et al. |
| 7,076,491 B2 | 7/2006 | Tsao |
| 7,080,073 B1 | 7/2006 | Jiang et al. |
| 7,080,085 B1 | 7/2006 | Choy et al. |
| 7,100,082 B2 | 8/2006 | Little et al. |
| 7,143,099 B2 | 11/2006 | Lecheler-Moore et al. |
| 7,146,536 B2 | 12/2006 | Bingham et al. |
| 7,158,980 B2 | 1/2007 | Shen |
| 7,162,499 B2 | 1/2007 | Lees et al. |
| 7,165,024 B2 | 1/2007 | Glover et al. |
| 7,174,504 B2 | 2/2007 | Tsao |
| 7,181,471 B1 | 2/2007 | Ibuki et al. |
| 7,194,380 B2 | 3/2007 | Barrow et al. |
| 7,197,449 B2 | 3/2007 | Hu et al. |
| 7,216,073 B2 | 5/2007 | Lavi et al. |
| 7,260,573 B1 | 8/2007 | Jeh et al. |
| 7,263,565 B2 | 8/2007 | Tawara et al. |
| 7,277,879 B2 | 10/2007 | Varadarajan |
| 7,302,646 B2 | 11/2007 | Nomiyama et al. |
| 7,305,380 B1 | 12/2007 | Hoelzle et al. |
| 7,325,160 B2 | 1/2008 | Tsao |
| 7,363,312 B2 | 4/2008 | Goldsack |
| 7,376,895 B2 | 5/2008 | Tsao |
| 7,398,461 B1 | 7/2008 | Broder et al. |
| 7,409,381 B1 | 8/2008 | Steel et al. |
| 7,412,078 B2 | 8/2008 | Kim |
| 7,418,736 B2 | 8/2008 | Ghanea-Hercock |
| 7,472,182 B1 | 12/2008 | Young et al. |
| 7,483,829 B2 | 1/2009 | Murakami et al. |
| 7,493,308 B1 | 2/2009 | Bair et al. |
| 7,493,317 B2 | 2/2009 | Geva |
| 7,587,387 B2 | 9/2009 | Hogue |
| 7,672,971 B2 | 3/2010 | Betz et al. |
| 7,685,201 B2 | 3/2010 | Zeng et al. |
| 7,698,303 B2 | 4/2010 | Goodwin et al. |
| 7,747,571 B2 | 6/2010 | Boggs |
| 7,756,823 B2 | 7/2010 | Young et al. |
| 7,797,282 B1 | 9/2010 | Kirshenbaum et al. |
| 7,885,918 B2 | 2/2011 | Statchuk |
| 7,917,154 B2 | 3/2011 | Fortescue et al. |
| 7,953,720 B1 | 5/2011 | Rohde et al. |
| 8,024,281 B2 | 9/2011 | Proctor et al. |
| 8,065,290 B2 | 11/2011 | Hogue |
| 8,108,501 B2 | 1/2012 | Birnie et al. |
| 2001/0021935 A1 | 9/2001 | Mills |
| 2002/0022956 A1 | 2/2002 | Ukrainczyk et al. |
| 2002/0038307 A1 | 3/2002 | Obradovic et al. |
| 2002/0042707 A1 | 4/2002 | Zhao et al. |
| 2002/0065845 A1 | 5/2002 | Naito et al. |
| 2002/0073115 A1 | 6/2002 | Davis |
| 2002/0083039 A1 | 6/2002 | Ferrari et al. |
| 2002/0087567 A1 | 7/2002 | Spiegler et al. |
| 2002/0107861 A1 | 8/2002 | Clendinning et al. |
| 2002/0147738 A1 | 10/2002 | Reader |
| 2002/0169770 A1 | 11/2002 | Kim et al. |
| 2002/0174099 A1 | 11/2002 | Raj et al. |

(56) References Cited

U.S. PATENT DOCUMENTS

| | | |
|---|---|---|
| 2002/0178448 A1 | 11/2002 | Te Kiefte et al. |
| 2002/0194172 A1 | 12/2002 | Schreiber |
| 2003/0018652 A1 | 1/2003 | Heckerman et al. |
| 2003/0058706 A1 | 3/2003 | Okamoto et al. |
| 2003/0069880 A1 | 4/2003 | Harrison et al. |
| 2003/0078902 A1 | 4/2003 | Leong et al. |
| 2003/0088607 A1 | 5/2003 | Ruellan et al. |
| 2003/0097357 A1 | 5/2003 | Ferrari et al. |
| 2003/0120644 A1 | 6/2003 | Shirota |
| 2003/0120675 A1 | 6/2003 | Stauber et al. |
| 2003/0126102 A1 | 7/2003 | Borthwick |
| 2003/0126152 A1 | 7/2003 | Rajak |
| 2003/0149567 A1 | 8/2003 | Schmitz et al. |
| 2003/0149699 A1 | 8/2003 | Tsao |
| 2003/0154071 A1 | 8/2003 | Shreve |
| 2003/0167163 A1 | 9/2003 | Glover et al. |
| 2003/0177110 A1 | 9/2003 | Okamoto et al. |
| 2003/0182310 A1 | 9/2003 | Charnock et al. |
| 2003/0195872 A1 | 10/2003 | Senn |
| 2003/0195877 A1 | 10/2003 | Ford et al. |
| 2003/0196052 A1 | 10/2003 | Bolik et al. |
| 2003/0204481 A1 | 10/2003 | Lau |
| 2003/0208354 A1 | 11/2003 | Lin et al. |
| 2004/0003067 A1 | 1/2004 | Ferrin |
| 2004/0015481 A1 | 1/2004 | Zinda |
| 2004/0024739 A1 | 2/2004 | Copperman et al. |
| 2004/0059726 A1 | 3/2004 | Hunter et al. |
| 2004/0064447 A1 | 4/2004 | Simske et al. |
| 2004/0088292 A1 | 5/2004 | Dettinger et al. |
| 2004/0107125 A1 | 6/2004 | Guheen et al. |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. |
| 2004/0177015 A1 | 9/2004 | Galai et al. |
| 2004/0177080 A1 | 9/2004 | Doise et al. |
| 2004/0199923 A1 | 10/2004 | Russek |
| 2004/0243552 A1 | 12/2004 | Titemore et al. |
| 2004/0243614 A1 | 12/2004 | Boone et al. |
| 2004/0255237 A1 | 12/2004 | Tong |
| 2004/0260979 A1 | 12/2004 | Kumai |
| 2004/0267700 A1 | 12/2004 | Dumais et al. |
| 2004/0268237 A1 | 12/2004 | Jones et al. |
| 2005/0076012 A1 | 4/2005 | Manber et al. |
| 2005/0080613 A1 | 4/2005 | Colledge et al. |
| 2005/0086211 A1 | 4/2005 | Mayer |
| 2005/0086222 A1 | 4/2005 | Wang et al. |
| 2005/0086251 A1 | 4/2005 | Hatscher et al. |
| 2005/0097150 A1 | 5/2005 | McKeon et al. |
| 2005/0108630 A1 | 5/2005 | Wasson et al. |
| 2005/0125311 A1 | 6/2005 | Chidiac et al. |
| 2005/0149576 A1 | 7/2005 | Marmaros et al. |
| 2005/0149851 A1 | 7/2005 | Mittal |
| 2005/0159851 A1 | 7/2005 | Engstrom et al. |
| 2005/0187923 A1 | 8/2005 | Cipollone |
| 2005/0188217 A1 | 8/2005 | Ghanea-Hercock |
| 2005/0240615 A1 | 10/2005 | Barsness et al. |
| 2005/0256825 A1 | 11/2005 | Dettinger et al. |
| 2006/0036504 A1 | 2/2006 | Allocca et al. |
| 2006/0041597 A1 | 2/2006 | Conrad et al. |
| 2006/0047691 A1 | 3/2006 | Humphreys et al. |
| 2006/0047838 A1 | 3/2006 | Chauhan |
| 2006/0053171 A1 | 3/2006 | Eldridge et al. |
| 2006/0053175 A1 | 3/2006 | Gardner et al. |
| 2006/0064411 A1 | 3/2006 | Gross et al. |
| 2006/0074824 A1 | 4/2006 | Li |
| 2006/0074910 A1 | 4/2006 | Yun et al. |
| 2006/0085465 A1 | 4/2006 | Nori et al. |
| 2006/0112110 A1 | 5/2006 | Maymir-Ducharme et al. |
| 2006/0123046 A1 | 6/2006 | Doise et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0152755 A1 | 7/2006 | Curtis et al. |
| 2006/0167991 A1 | 7/2006 | Heikes et al. |
| 2006/0224582 A1 | 10/2006 | Hogue |
| 2006/0238919 A1 | 10/2006 | Bradley et al. |
| 2006/0242180 A1 | 10/2006 | Graf et al. |
| 2006/0248045 A1 | 11/2006 | Toledano et al. |
| 2006/0248456 A1 | 11/2006 | Bender et al. |
| 2006/0253418 A1 | 11/2006 | Charnock et al. |
| 2006/0259462 A1 | 11/2006 | Timmons |
| 2006/0277169 A1 | 12/2006 | Lunt et al. |
| 2006/0288268 A1 | 12/2006 | Srinivasan et al. |
| 2006/0293879 A1 | 12/2006 | Zhao et al. |
| 2007/0005593 A1 | 1/2007 | Self et al. |
| 2007/0005639 A1 | 1/2007 | Gaussier et al. |
| 2007/0016890 A1 | 1/2007 | Brunner et al. |
| 2007/0038610 A1 | 2/2007 | Omoigui |
| 2007/0043708 A1* | 2/2007 | Tunstall-Pedoe ................ 707/3 |
| 2007/0055656 A1 | 3/2007 | Tunstall-Pedoe |
| 2007/0073768 A1 | 3/2007 | Goradia |
| 2007/0094246 A1 | 4/2007 | Dill et al. |
| 2007/0100814 A1 | 5/2007 | Lee et al. |
| 2007/0130123 A1 | 6/2007 | Majumder |
| 2007/0143282 A1 | 6/2007 | Betz et al. |
| 2007/0143317 A1 | 6/2007 | Hogue et al. |
| 2007/0150800 A1 | 6/2007 | Betz et al. |
| 2007/0198451 A1 | 8/2007 | Kehlenbeck et al. |
| 2007/0198480 A1 | 8/2007 | Hogue et al. |
| 2007/0198481 A1 | 8/2007 | Hogue et al. |
| 2007/0198503 A1 | 8/2007 | Hogue et al. |
| 2007/0198577 A1 | 8/2007 | Betz et al. |
| 2007/0198598 A1 | 8/2007 | Betz et al. |
| 2007/0198600 A1 | 8/2007 | Betz |
| 2007/0203867 A1 | 8/2007 | Hogue et al. |
| 2007/0208773 A1 | 9/2007 | Tsao |
| 2007/0271268 A1 | 11/2007 | Fontoura et al. |
| 2008/0071739 A1 | 3/2008 | Kumar et al. |
| 2008/0104019 A1 | 5/2008 | Nath |
| 2009/0006359 A1 | 1/2009 | Liao |
| 2009/0119255 A1 | 5/2009 | Frank et al. |

FOREIGN PATENT DOCUMENTS

| | | |
|---|---|---|
| JP | 2002-157276 | 5/2002 |
| JP | 2002-540506 A | 11/2002 |
| JP | 2003-281173 A | 10/2003 |
| WO | WO 01/27713 A2 | 4/2001 |
| WO | WO 2004/114163 A2 | 12/2004 |
| WO | WO 2006/104951 A1 | 10/2006 |

OTHER PUBLICATIONS

Andritsos: Information-theoretic tools for mining database structure from large data sets, ACM SIGMOD, Jun. 13-18, 2004, 12 pgs.

Betz, Examiner's Answer, U.S. Appl. No. 11/097,688, Jul. 8, 2010, 18 pgs.

Betz, Examiner's Answer, U.S. Appl. No. 11/394,414, Jan. 24, 2011, 31 pgs.

Betz, Notice of Allowance, U.S. Appl. No. 11/142,740, Apr. 16, 2009, 7 pgs.

Betz, Notice of Allowance, U.S. Appl. No. 11/142,765, Jul. 1, 2010, 14 pgs.

Betz, Notice of Allowance, U.S. Appl. No. 11/341,069, Sep. 8, 2008, 6 pgs.

Betz, Notice of Allowance, U.S. Appl. No. 12/939,981, Aug. 11, 2011, 7 pgs.

Betz, Notice of Allowance, U.S. Appl. No. 12/939,981, Apr. 26, 2011, 11 pgs.

Betz, Office Action, U.S. Appl. No. 11/142,740, Aug. 13, 2007, 12 pgs.

Betz, Office Action, U.S. Appl. No. 11/142,740, May 17, 2007, 12 pgs.

Betz, Office Action, U.S. Appl. No. 11/142,740, Jul. 23, 2008, 11 pgs.

Betz, Office Action, U.S. Appl. No. 11/142,740, Dec. 26, 2007, 12 pgs.

Betz, Office Action, U.S. Appl. No. 11/142,740, Jan. 27, 2009, 11 pgs.

(56) References Cited

OTHER PUBLICATIONS

Betz, Office Action, U.S. Appl. No. 11/142,740, Apr. 30, 2008, 14 pgs.
Betz, Office Action, U.S. Appl. No. 11/097,688, Mar. 18, 2009, 13 pgs.
Betz, Office Action, U.S. Appl. No. 11/097,688, Oct. 29, 2009, 11 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.
Betz, Office Action, U.S. Appl. No. 11/394,552, Mar. 13, 2009, 12 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Brill et al:, An analysis of the askMSR question-answering system, Proceedings of the Conference on Empirical Methods in Natural Language Processing (EMNLP) Jul. 2002, pp. 257-264.
Brin, Extracting patterns and relations from the world wide web, 1999, 12 pgs.
Brin, The anatomy of a large-scale hypertextual search engine, Apr. 14-18, 1998, 26 pgs.
Bunescu, R., et al: Using encyclopedia knowledge for named entity disambiguation, Department of Computer Science, University of Texas, retrieved from the internet, Dec. 28, 2006, 8 pgs.
Chang, C. et al: IEPAD: Information extraction based on pattern discovery, WWW10, AMC, May 1-5, 2001, pp. 681-688.
Chen: A scheme for inference problems using rough sets and entropy, Lecture notes in Computer Science, vol. 3642/2005, Regina, Canada Aug. 31-Sep. 3, 2005, 10 pgs.
Chu-Carroll, J. et al., A multi-strategy and multi-source approach to question answering, 2006, 8 pgs.
Cover, Entropy, relative entropy and mutual information, Chapter 2 Elements of Information Theory, 1991, 13 pgs.
Craswell, N., et al: Effective site finding using link anchor information, SIGIR'01, Sep. 9-12, 2001, 8 pgs.
Dean, J. et al.: MapReduce: Simplified data processing on large clusters, To appears in OSDI 2004, 13 pgs.
Dean: Using design recovery techniques to transform legacy systems, Proceedings IEEE International Conference, 2001, 10 pgs.
Dong, X. et al.: Reference reconciliation in complex information spaces, SIGACM-SIGMOD, 2005, 12 pgs.
Downey, D.: Learning text patterns for web information extraction and assessment, American Association for Artificial Intelligence, 2002, 6 pgs.

Etzioni: Unsupervised named-entity extraction from the web: an experimental study, Dept. of Computer Science and Engineering, University of Washington, Seattle, WA Feb. 28, 2005, 42 pgs.
Etzioni, O. et al., Web-scale information extraction in knowitall (preliminary results), WWW04, AMC, May 17-22, 2004, 11 pgs.
Freitag, D. et al.: Boosted wrapped induction, American Association of Artificial Intelligence, 2000, 7 pgs.
Gao, X., et al.: Learning information extraction patterns from tabular web pages without manual labelling, Proceedings of the IEEE/WIC Int'l Conf. on Web Intelligence (WI'03), Oct. 13-17, 2009, 4 pgs.
Gigablast: Web/Directory, http://www.gigablast.com/?c=dmz3 printed Aug. 24, 2010, 1 pg.
Gilster, P: Get fast answers easily, The News Observer, May 14, 2003 2 pgs.
Google, ISR/WO, PCT/US2006/007639, Sep. 13, 2006, 5 pgs.
Google, ISR/WO, PCT/US2006/010965, Jul. 5, 2006, 4 pgs.
Google, ISR/WO, PCT/US2006/019807, Dec. 18, 2006, 4 pgs.
Google, ISR/WO, PCT/US2007/061156, Feb. 11, 2008, 5 pgs.
Google, Office Action, CA 2,610,208, Sep. 21, 2011, 3 pgs.
Google, Office Action, JP 2008-504204, Oct. 12, 2011, 3 pgs.
Gray, R.M.: Entropy and information theory, Springer-Verlag, NY, NY, 1990, 30 pgs.
Guha, R. et al., Disambiguating people in search, WWW04, AMC, May 17-20, 2004, 9 pgs.
Guha, R, Object co-identification on the semantic web, WWW04, AMC, May 17-22, 2004, 9 pgs.
Haveliwala, T.H.: Topic-sensitive pagerank, Proceedings of the 11th Int'l World Wide Web Conference, Honolulu, Hawaii, May 7-11, 2002, 23 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.

(56) References Cited

OTHER PUBLICATIONS

Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jan. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Hogue, Tree pattern inference and matching for wrapper induction on the world wide web, Jun. 2004, 106 pgs.
Hsu, Finite-state transducers for semi-structured text mining, 1999.
Ilyas, Rank-aware query optimization, Jun. 13-18, 2004, 12 pgs.
Information entropy, Wikipedia, May 3, 2006, 9 pgs.
Jeh, Scaling personalized web search, May 20-24, 2003, 24 pgs.
Ji, Re-ranking algorithms for name tagging, Jun. 2006, 8 pgs.
Jones: Bootstrapping for text learning tasks, 1999, 12 pgs.
Koeller: Approximate matching of textual domain attributes for information source integration, Jun. 17, 2005, 10 pgs.
Kolodner: Indexing and retrieval strategies for natural language fact retrieval, ACM Trans. Database System 8.3, Sep. 1983, 31 pgs.
Kosala, R.: Web mining research, A Survey, SIGKDD Explorations, vol. 2, Issue 1, p. 1 Jul. 2000, 15 pgs.
Kosseim, L., Answer formulation for question-answering, Oct. 1, 2007, 11 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Lin, J. et al.: Question answering from the web using knowledge annotation and knowledge mining techniques, CIKM'03, Nov. 3-8, 2003, 8 pgs.
Liu, B., Mining data records in web pages, Conference 00, ACM, 2000, 10 pgs.
MacKay, D.J.C.: Information theory, inference and learning algorithms, Cambridge University Press, 2003, pp. 22-33, 138-140.
Mann, G., et al.: Unsupervised personal name disambiguation, Proceedings of the Seventy Conference on Natural Language Learning at HLT_NAACL, 2003, 8 pgs.
McCallum, et al., Object consolidation by graph partitioning with a conditionally-trained distance metric, SIGKDD 03, ACM, Aug. 24-27, 2003, 6 pgs.
Merriam Webster Dictionary defines "normalize" as "To make conform to or reduce to a norm or standard", 1865, 2 pgs.
Merriam Webster Dictionary defines "value" as "A numerical quantity that is assigned or is determined by . . . ", 1300, 2 pgs.
Microsoft Computer Dictionary defines "normalize" as "adjust number within specific range", May 1, 2002, 4 pgs.
Microsoft Computer Dictionary defines "quantity" as a "number", May 1, 2002, 4 pgs.
Microsoft Computer Dictionary defines "value" as a "quantity", May 1, 2002, 4 pgs.
Mihalcea, R. et al., PageRank on semantic networks with application to word sense disambiguation, Aug. 23-27, 2004, 7 pgs.
Mihalcea, R. et al., TextRank: bringing order into texts, Jul. 2004, 8 pgs.
Nadeau: Unsupervised named-entity recognition: generating gazetteers and resolving ambiguity, Inst. for Information Technology, National Research Council Canada, Gatineau and Ottawa, Canada, Aug. 1, 2006, 12 pgs.
Nyberg, E. et al.: The JAVELIN question-answering system at TREC 2003: A Multi-Strategy Approach with Dynamic Planning, Nov. 18-21, 2003, 9 pgs.
Ogden, W. et al.: Improving cross-language text retrieval with human interactions, Proceedings of the 33rd Hawaii International Conference on System Science, IEEE, Jan. 2000, 9 pgs.
Page, L., et al: The pagerank citation ranking: bringing order to the web, Stanford Digital Libraries Working Paper, 1998, 17 pgs.
Pawson D.: Sorting and grouping, www.dpawson.uk.xsl/sect2/N6280.html Feb. 7, 2004, 19 pgs.
Plaisant, C. et al.: Interface and data architecture for query preview in networked information systems, ACM Transaction on Information Systems, vol. 17, Issue 3, Jul. 1999, 28 pgs.
Prager, J. et al., IBM's piquant in TREC2003, Nov. 18-21, 2003, 10 pgs.
Prager, H. et al., Question answering using constraint satisfaction: QA-by-dossier-with-constraints, 2004, 8 pgs.
Ramakrishnan, G. et al., Is question answering an acquired skill?, WWW04, ACM, May 17-22, 2004, 10 pgs.
Richardson, M. et al.: Beyond page rank: machine learning for static ranking, International World Wide Web Conference Committee May 23, 2006, 9 pgs.
Richardson, M. et al.: The intelligent surfer: probabilistic combination of link and content information in page rank, Advance in Neural Information Processing System, vol. 14, MIT Press, Cambridge, MA, 2002, 8 pgs.
Riloff, E., et al: Learning dictionaries for information extraction by multi-level bootstrapping, American Association for Artificial Intelligence, 1999, 6 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. No. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Aug. 28, 2009, 11 pgs.
Rohde, Office Action, U.S. Appl. No. 11/097,690, Sep. 28, 2007, 17 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.

(56) References Cited

OTHER PUBLICATIONS

Shannon, C.E. et al.: A mathematical theory of communication, The Bell System Technical Journal, vol. 27, Jul., Oct. 1948, 55 pgs.
Sun Microsystems: Attribute Names, ONLINE: http://java.sun.com/products/jndi/tutorial/basics/directory/attrnames.html, Feb. 17, 2004, 2 pgs.
Vespe, Notice of Allowance, U.S. Appl. No. 11/686,217, Aug. 27, 2012, 16 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Wang, Y. et al.: C4-2: Combining link and contents in clustering web search results to improve information interpretation, The University of Tokyo, 2002, 9 pgs.
Wirzenius, Lars,: C preprocessor trick for implementing similar data types, Jan. 17, 2000, 9 pgs.
Zhao, et al: Corroborate and learn facts from the web, KDD'07, Aug. 12-15, 2007, 9 pgs.
Zhao, Notice of Allowance, U.S. Appl. No. 11/394,610, May 11, 2009, 15 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Jan. 27, 2011, 24 pgs.
Zhao, Office Action, U.S. Appl. No. 11/941,382, Dec. 29, 2009, 25 pgs.
Betz, Notice of Allowance, U.S. Appl. No. 13/302,755, Aug. 28, 2013, 6 pgs.
Betz, Office Action, U.S. Appl. No. 11/394,552, Apr. 23, 2013, 21 pgs.
Betz, Office Action, U.S. Appl. No. 13/302,755, Mar. 25, 2013, 15 pgs.
Google Inc., Office Action, CA 2603085, Sep. 18, 2012, 2 pgs.
Hogue, Notice of Allowance, U.S. Appl. No. 13/549,361, Jun. 26, 2013, 8 pgs.
Hogue, Office Action, U.S. Appl. No. 13/549,361, Mar. 6, 2013, 13 pgs.
Laroco, Notice of Allowance, U.S. Appl. No. 13/364,244, Aug. 6, 2013, 6 pgs.
Laroco, Office Action, U.S. Appl. No. 13/364,244, Jan. 30, 2013, 8 pgs.
Shamsi, Office Action, U.S. Appl. No. 13/171,296, Apr. 3, 2013, 7 pgs.
Zhao, Office Action, U.S. Appl. No. 11/941,382, Nov. 26, 2012, 24 pgs.

\* cited by examiner

| | | | |
|---|---|---|---|
| | Google Search: michael jackson - Mozilla Firefox | | |
| | File Edit View Go Bookmarks Tools Help | | |

Google
Reference Pages michael jackson — [Search Objects] [Search the Web]  Advanced Search / Preferences

— 406                                              500

Michael Jackson  [person]                                Results 1 - 1 of 1 for michael jackson (6 ms)

510a — Date of Birth         29 August 1958 (According to: en.wikipedia.org) ⎯ 512         Maps and pictures
510b — Place of Birth        Gary, Indiana (According to: concerts.ticketsnow.com)          View larger map/image
       Full Name             Michael Joseph Jackson (According to: en.wikipedia.org)
       Full Name             Michael Jackson (According to: simple.wikipedia.org)
       Birth Name            Michael Joseph Jackson (According to: www.123musicstars.com)
       Spouse                Lisa Marie Presley (18 May 1994 - 18 January 1996) (divorced) (According to: afgen.com)
       Spouse                Debbie Rowe (16 November 1996 - 8 October 1999) (divorced) 2 children (According to: www.imdb.com)
       Place of Birth        Gary, Indiana, USA (According to: www.123musicstars.com)
       Height                5' 10 (According to: www.allmovieportal.com)
       Height                5 FT. 10 in. (According to: www.altocelebs.com)
       Height                5 FT. 10 in. (1m78) (According to: www.filmbug.co.uk)
       Band                  The Jackson Five (According to: www.soundbug.com)
       Famous for            His 1982 Album Thriller (According to: www.superonpics.com)
       Height                5' 10" (1.78 M) (According to: www.imdb.com)
       Nickname              The Gloved One
                             Wacko Jacko
                             Jacko
                             King Of Pop
                             MJ (According to: www.imdb.com)
       Listed in Category    Musicians & Singers (According to: www.celebrity-link.com)
       Occupation            Musician, Actor (According to: www.filmbug.co.uk)
       Occupation            Musician, Song Writer, Actor (According to: www.allmovieportal.com)
       Famous As             Pop singer, composer, actor, producer, songwriter (According to: www.aceshowbiz.com)
       Nationality           American (According to: www.allmovieportal.com)
       Nick Name             Jacko, King of Pop (According to: www.altocelebs.com)
       Band                  The Jacksons (According to: www.filmbug.co.uk)
       Sex                   M (According to: www.allmovieportal.com)
       Musical Genre         Pop, R&B (According to: www.soundbug.com)
       Heritage              American (According to: www.superonpics.com)
       Name                  Michael Jackson (According to: www.allmovieportal.com)
       Sign                  Virgo (According to: www.filmbug.co.uk)
       Date of Birth         29 August 1958 (47) (According to: www.filmbug.co.uk)
       Born                  29 August 1958 (Virgo) (According to: www.soundbug.com)
       Nationality           US - United States of America (According to: www.altocelebs.com)
       Born As               Michael Joseph Jackson (According to: www.altocelebs.com)
510c — Wrote                 Thriller (1983) (V) (According to: imagine-contact.com)
       Wrote                 Michael Jackson: HIStory on Film - Volume II (1997) (V) (According to: www.imdb.com)
       Wrote                 Moonwalker (1988) (According to: musicstore.mymmode.com)

AUTOMATIC OBJECT REFERENCE IDENTIFICATION AND LINKING IN A BROWSEABLE FACT REPOSITORY

CROSS REFERENCE TO RELATED APPLICATIONS

This application is a continuation of U.S. patent application Ser. No. 11/356,837, filed Feb. 17, 2006, now U.S. Pat. No. 8,260,785 which is incorporated by reference herein in its entirety.

This application is related to the following U.S. Patent Applications all of which are incorporated by reference herein: U.S. patent application Ser. No. 11/357,748, filed on Feb. 17, 2006; U.S. patent application Ser. No. 11/342,290, filed on Jan. 27, 2006; U.S. patent application Ser. No. 11/342,293, filed on Jan. 27, 2006; U.S. patent application Ser. No. 11/356,679, filed on Feb. 17, 2006; U.S. patent application Ser. No. 11/356,851, filed on Feb. 17, 2006; U.S. patent application Ser. No. 11/356,842, filed on Feb. 17, 2006; U.S. patent application Ser. No. 11/356,728, filed on Feb. 17, 2006; U.S. patent application Ser. No. 11/341,069, filed on Jan. 27, 2006; U.S. patent application Ser. No. 11/356,838, filed on Feb. 17, 2006; U.S. patent application Ser. No. 11/356,765, filed on Feb. 17, 2006.

TECHNICAL FIELD

The present application relates to a knowledge and fact databases, and in particularly to user interfaces, methods, and systems for browsing such database.

BACKGROUND

Knowledge bases are collections of facts and data organized into systematic arrangements of information. Knowledge bases often include search tools for searching and browsing facts. Online knowledge bases have become increasingly prevalent on the Internet, and examples include WordNet, Wikipedia, Webopedia, and similar online encyclopedias, dictionaries, and document collections.

In a typical online knowledge base such as Wikipedia or Wordnet, it is common for the content of one entry to include terms or words that are the names or titles or other entries in the database. Thus, in the Wikipedia online encyclopedia, the entry for "American Revolution" includes many terms, such as "George Washington" or "Declaration of Independence." Given that these databases use hypertext, it is conventional that a phrase such as "George Washington" is constructed as the anchor text for a hyperlink from the "American Revolution" entry to the "George Washington" entry. More specifically, these types of hyperlinks are fixed in that they reference a specific page or entry in the database. For example, in the Wikipedia entry for "American Revolution", the hyperlink for the phrase "George Washington" is the following URL (uniform resource locator):

http://en.wikipedia.org/wiki/George_Washington where the last portion of the URL, "George_Washington" identifies a specific, pre-existing document in the Wikipedia document collection.

This approach to linking of phrases between entries in an online knowledge base works only where the referenced entry (e.g., here the entry for "George Washington") exists at the time the referencing entry (e.g., here the entry for "American Revolution") is written, so that the latter's author can manually include the appropriate link to the referenced entry.

A problem arises then in an online knowledge base which is under going frequent changes, including the addition of new entries, and changes in existing entries. An existing entry may include terms or phrases for which there were no corresponding entries at the time the existing entry was written. For example, a knowledge base may include an entry on quantum mechanics, and a reference to string theory, but at the time quantum mechanics entry is written there is no other entry that describes string theory. However, at a late date, new entries may have been added which could be properly referenced for the terms of the existing entry. Thus, a new, subsequent entry in the database with the title "String Theory" may be created. Since these terms were not linked at the time the existing entry was authored, a user reading the entry on quantum mechanics would not know there is a corresponding entry on string theory.

Another problem with fixed (or "hard") entries is that they make it more difficult to update the database or change its file structure, since the pathname name of the referenced article cannot be changed without causing the hyperlink to malfunction.

SUMMARY

The present invention provides a methodology and system for automatically creating and maintaining links between facts in a fact repository. The fact repository includes a large collection of facts, each of which is associated with an object, such as a person, place, book, movie, country, or any other entity of interest. Each fact comprises an attribute, which is descriptive of the type of fact (e.g., "name," or "population"), and a value for that attribute (e.g., "George Washington", or "1,397,264,580"). A value can also contain any amount of text—from a single term or phrase to many paragraphs or pages—such as appropriate to describe the attribute. Each object will have a name fact that is the name of the object. The value of a value can thus include one or more phrases that are themselves the names of other fact.

In one embodiment, a two stage process is used to automatically construct and maintain links between facts in the repository. In a first stage, a set of name facts is collected to form a list of the name of objects in the repository. In a next stage, the value portion of some set of facts is processed to identify whether they include one or more names on the list of object names. (This second set may be the same set or a different set than that from which the object names were collected.) Where an object name is identified in the value of a fact, a search link is constructed, using the object name as anchor text, but using a search query at for the link contents. The search query is a query for any objects which have as a name the object name found in the value of the fact. Constructing the search link in this manner ensures that all facts that include the name of other facts will be properly linked to such other facts, even if they are created subsequently.

In one embodiment, the identification of object names in the fact values uses a phrase identification algorithm to first identify phrases in text of the fact values. Next, each of the identified phrases is compared with the list of object names to determine if it appears on the list. If an identified phrase is present in the list of object names, then the phrase is used as the anchor text for the search link.

The foregoing process is preferably repeated on periodic basis, for example daily, weekly, or any other time period. This ensures that new facts entered in the interval between repetitions are processed both to include the new object names on the object name list (so that existing facts can now properly reference such new object names), and to ensure that objects named in the value of such new facts are linked to previously existing facts.

The present invention further has embodiments in computer program products, in computer systems, and computer user interfaces, which various perform or cooperate in the operation or use of the foregoing method (or its alternative embodiments and features).

BRIEF DESCRIPTION OF THE DRAWINGS

FIG. 5 illustrates an object detail page.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
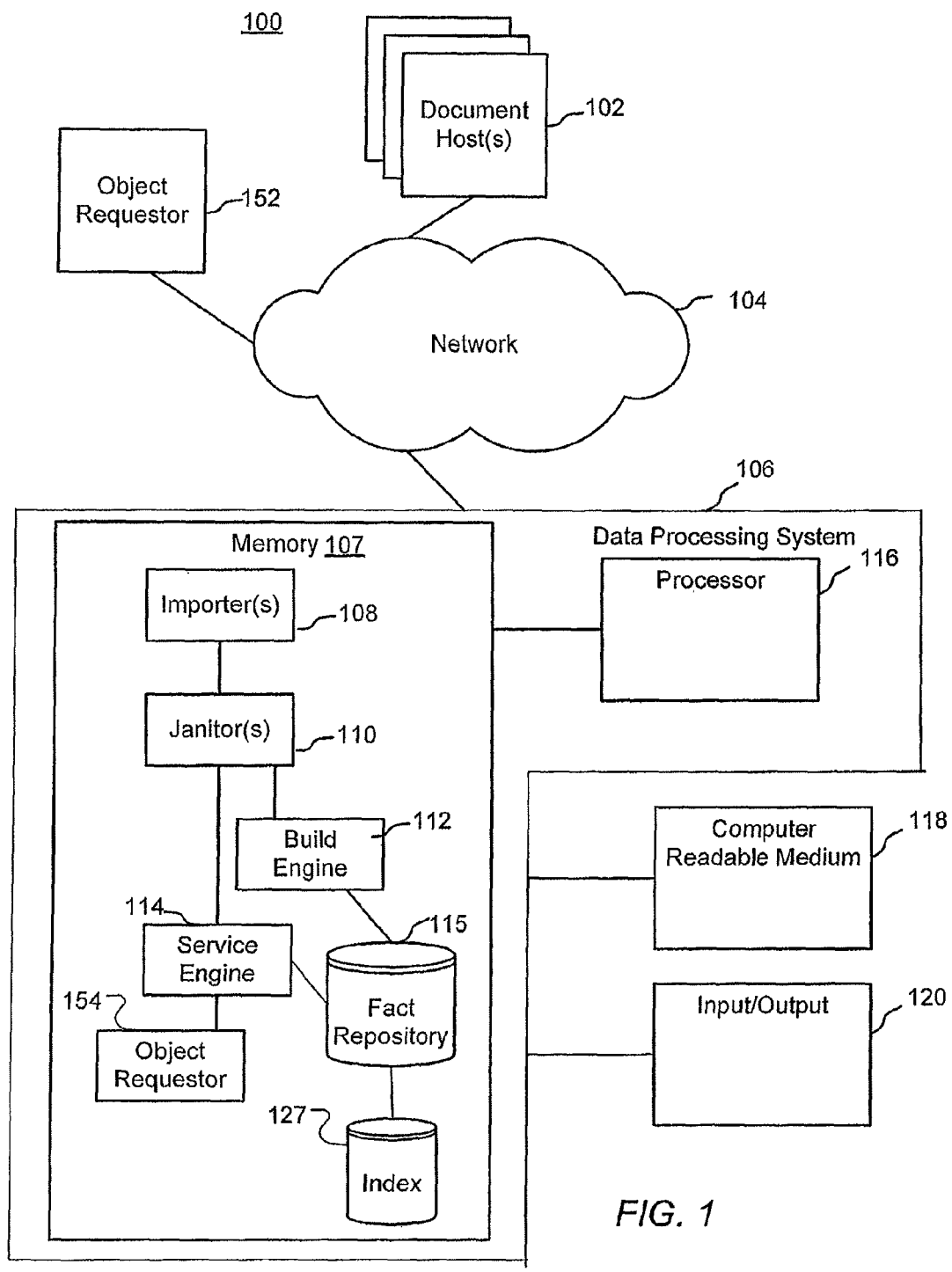
FIG. 1 shows a system architecture, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 operates over a network 104, through which any number of document hosts 102 communicate with a data processing system 106, along with any number of object requestors 152, 154.

Document hosts 102 store documents and provide access to documents. A document is comprised of any machine-readable data including any combination of text, graphics, multimedia content, etc. A document maybe encoded in a markup language, such Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, a fact repository 115 (also called simply a "repository"), and a context index 127. Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. An importer 108 analyzes the contents of the documents and extracts "facts" from the documents. The importers 108 also determine the subject or subjects with which the facts are associated, and extracts such facts into individual items of data, for storage in the fact repository 115. In one embodiment, there are different types of importers 108 for different types of documents, for example dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Build engine 112 builds and manages the repository 115. Service engine 114 is an interface for querying the repository 115. Its main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact within its contents. Repository 115 contains one or more facts. Preferably, each fact is programmatically associated with exactly one object. One implementation for this association comprises including in each fact an object ID that uniquely identifies the object of the association. In this manner, any number of facts may be associated with an individual object, by including the object ID for that object. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, and service engine 114, each of which are preferably implemented as instructions stored in memory 107 and executable by processor 116. Memory 107 also includes repository 115. Repository 115 can be stored in memory of one or more computer systems or in a type of memory such as a disk. FIG. 1 also includes a computer readable medium 118 containing, for example, at least one of importers 108, janitors 110, build engine 112, service engine 114 and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
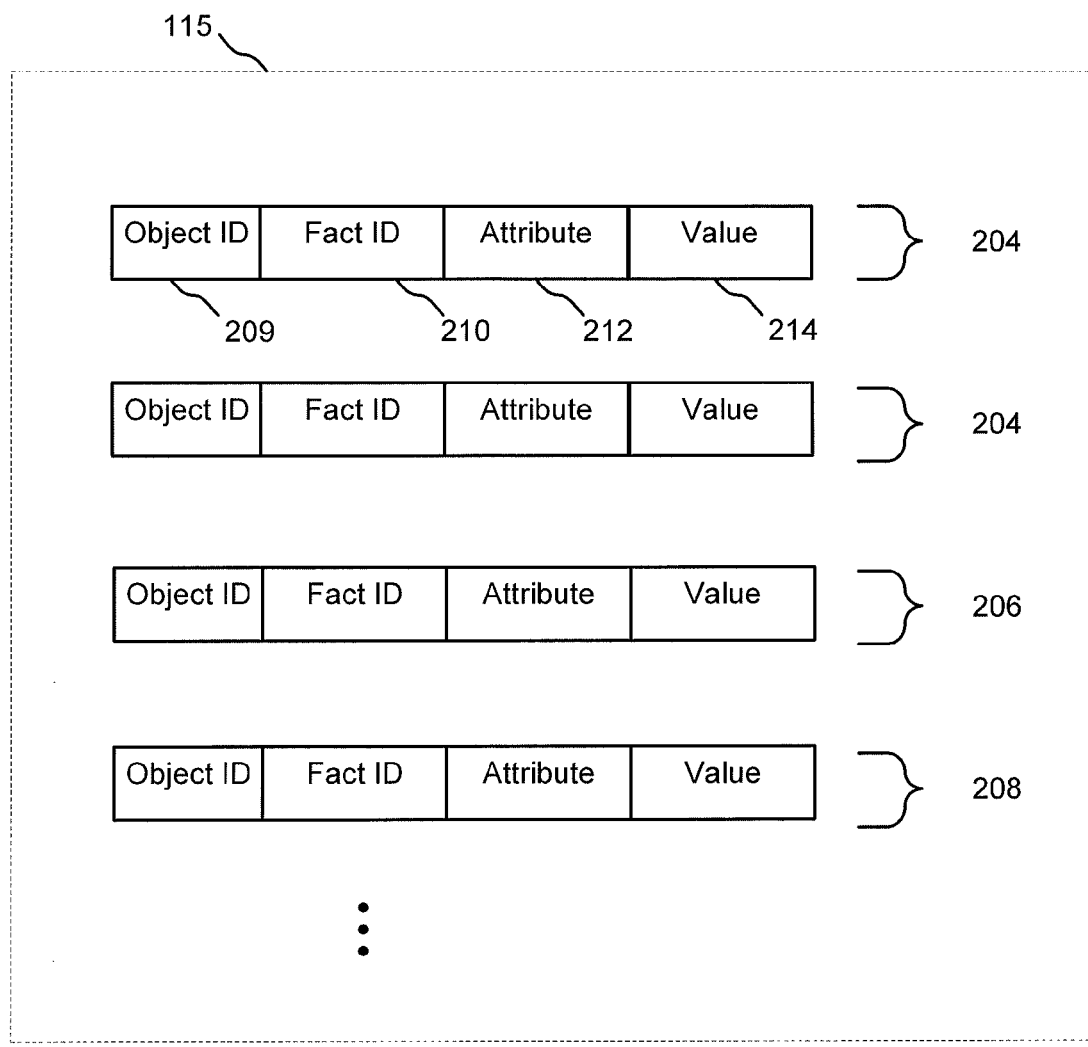
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. Other embodiments, however, may store facts as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory, but exist as in terms of the set of facts associated with the object. In another embodiment, objects are stored as data entities in memory, and include references (pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figures 2B, 2C:
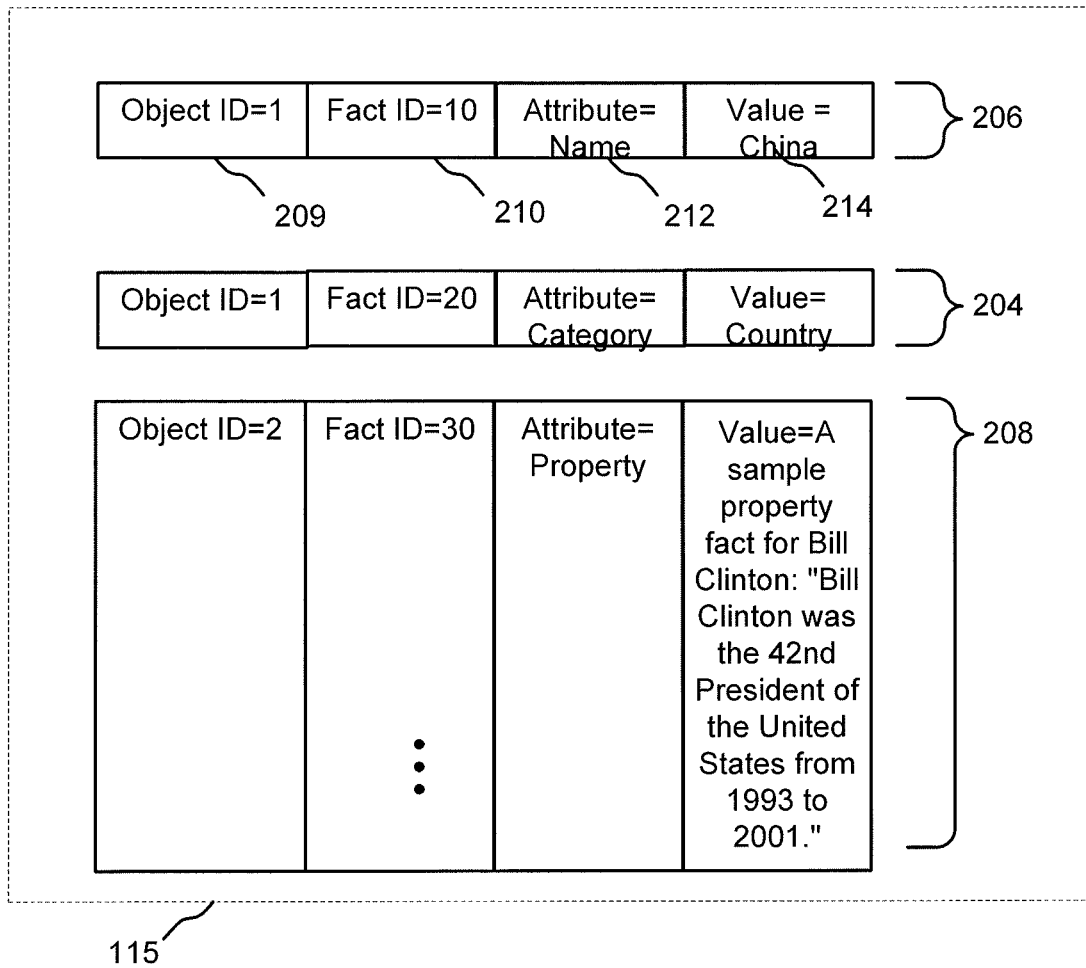

FIG. 2(b) shows an example of facts having respective fact IDs of 10, 20, 30, and 40 in repository 115. Facts 10, 20, and 30 are all associated with an object identified by object ID "1." Fact 10 has an attribute of "Name" and a value of "China." Fact 20 has an attribute of "Category" and a value of "Country." Fact 30 has an attribute of "In Asia" and a value of "yes." Thus, the object identified by object ID "1" has a name of "China," a category of "Country" and is in Asia. In contrast, fact 40 is associated with an object having ID "2." Fact 40 has an attribute of "Name" and a value of "Angora." In the illustrated embodiment, each fact has one attribute and one value. The number of facts associated with an object is not limited; thus while only three facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value.

FIG. 2(c) shows an example object reference table 210 that is used in some embodiments. The object reference table 210 functions to efficiently maintain the associations between object IDs and fact IDs. In the absence of an object reference table 210, it is also possible to find all facts for a given object ID by querying the repository to find all facts with a particular object ID. While FIG. 2(c) illustrates the object reference table 210 with explicit coding of object and fact IDs, the table may also be stored with use the IDs values themselves in column or pair-wise arrangements.

Figure 2D:
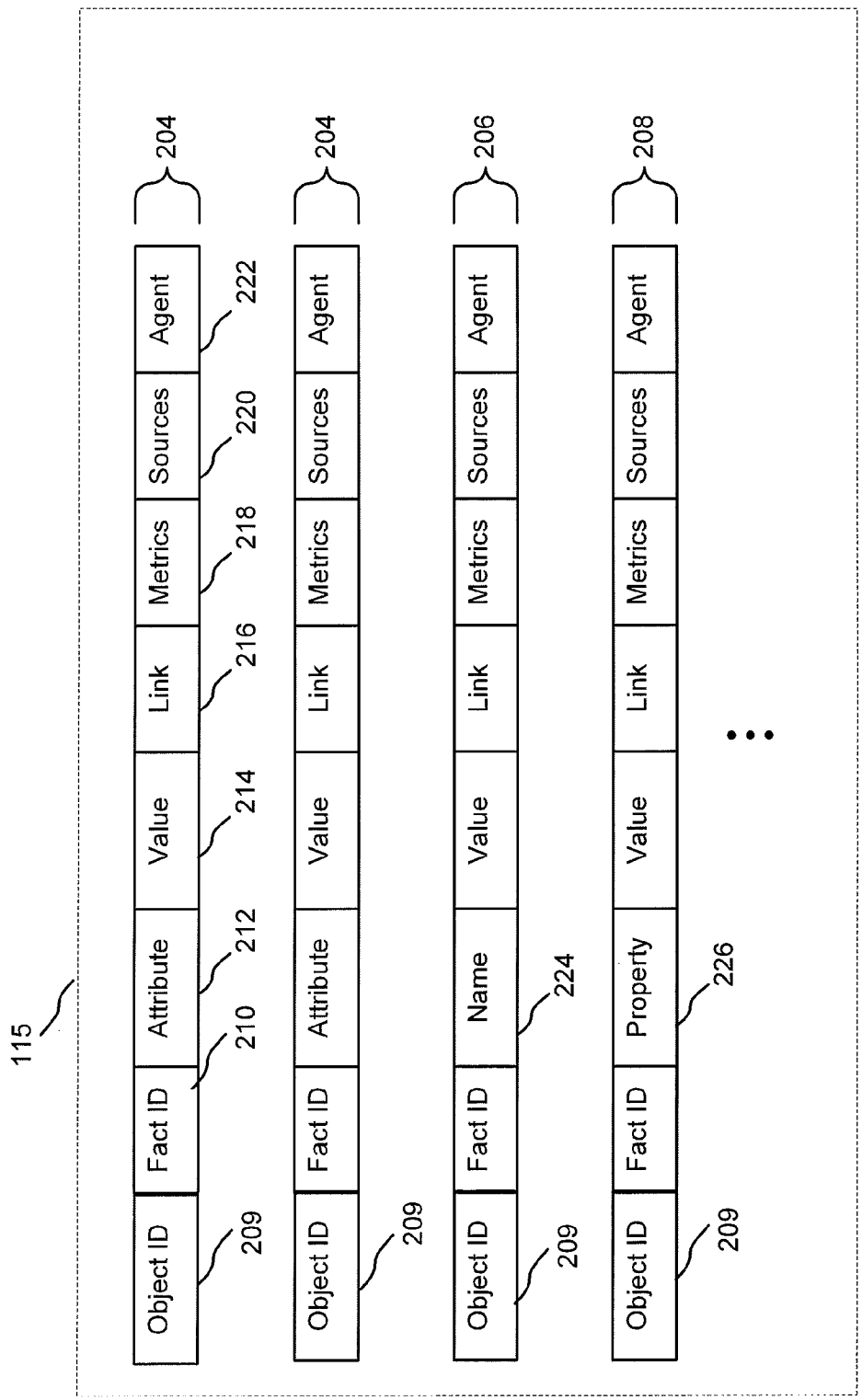

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 206 and a property fact 208. A name fact 206 is a fact that conveys a name for the entity or concept represented by the object ID. A name fact 206 includes an attribute of "name" and a value, which is the name of the object. For example, for an object representing the country Spain, a name fact would have the value "Spain." A name fact 206, being a special instance of a general fact 204, includes the same fields as any other fact 204; it has an attribute, a value, a fact ID, metrics, sources, etc. The attribute 224 of a name fact 206 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names.

A property fact 208 is a fact that conveys a statement about the entity or concept represented by the object ID. For example, for the object ID representing Spain, an associated property fact may convey that Spain is a country in Europe. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Spain, the value of a property fact may be the text string "is a country in Europe." Some object IDs may have one or more associated property facts while other objects may have no associated property facts. Property facts are useful to describe "is-a" and "has-a" relationships, or other types of hierarchical or compositional relationship.

It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts names are removed. A null object represents an entity or concept for which the data processing system 106 has no factual information and, as far as the data processing system 106 is concerned, does not exist. In some embodiments, facts of a null object may be left in the repository 115, but have their object ID values cleared (or set to null). However, the facts of the null object are treated as if they were removed from the repository 115. In some other embodiments, facts of null objects are physically removed from repository 115.

Figure 2E:
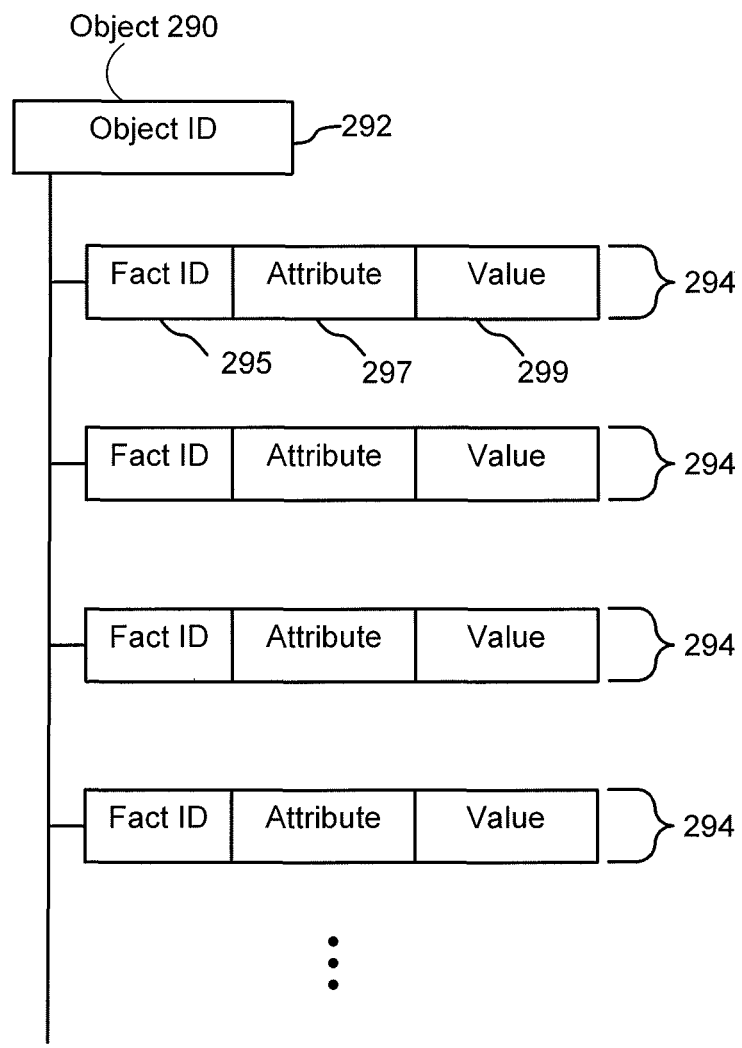
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Referring again to FIG. 1, the content of the facts in the repository 115 are also indexed in index 127. The index 127 maintains a term index, which maps terms to {object, fact, field, token} tuples, where "field" is, e.g., attribute or value. The service engine 114 is adapted to receive keyword queries from clients such as object requestors, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results.

In one embodiment the ranking (score) of an object is a linear combination of relevance scores for each of the facts. The relevance score for each fact is based on whether the fact includes one or more query terms (a hit) in either the attribute or value portion of the fact. Each hit is scored based on the frequency of the term that is hit, with more common terms getting lower scores, and rarer terms getting higher scores (e.g., using a TD-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts is selected for display in response to query.

The service engine 114 is also adapted to handle structured queries, using query operators that restrict the scope of a term match. A fact restriction operator, comprising brackets enclosing terms, e.g., "[terms]", restricts the term(s) to matching in a single fact. Field restriction operators attribute{ } and value{ } operators restrict to a single field. Thus, the query [altribute{name} value{"george washington"] restricts the scope of the match to the terms "george washington" appearing in the name fact.

User Interface for Browsing Fact Repository

Figure 3:
FIG. 3 illustrates a landing page for initiating a search query of a fact repository.

Referring now to FIGS. 3-6, there are shown various screens from a user interface for browsing the fact repository 115 in accordance with one embodiment of present invention. In FIG. 3 there is shown a simple landing or home page for initiating a query of the fact repository 115. The page 300 a search query field 302 and a search objects button 304. The user enters any number of search terms into the search field 302, such as the illustrated terms "michael jackson." The terms can be any terms whatsoever, as they may appear in any fact. The user selects the search objects button 304 to provide the search terms to the service engine 114.

Figure 4:
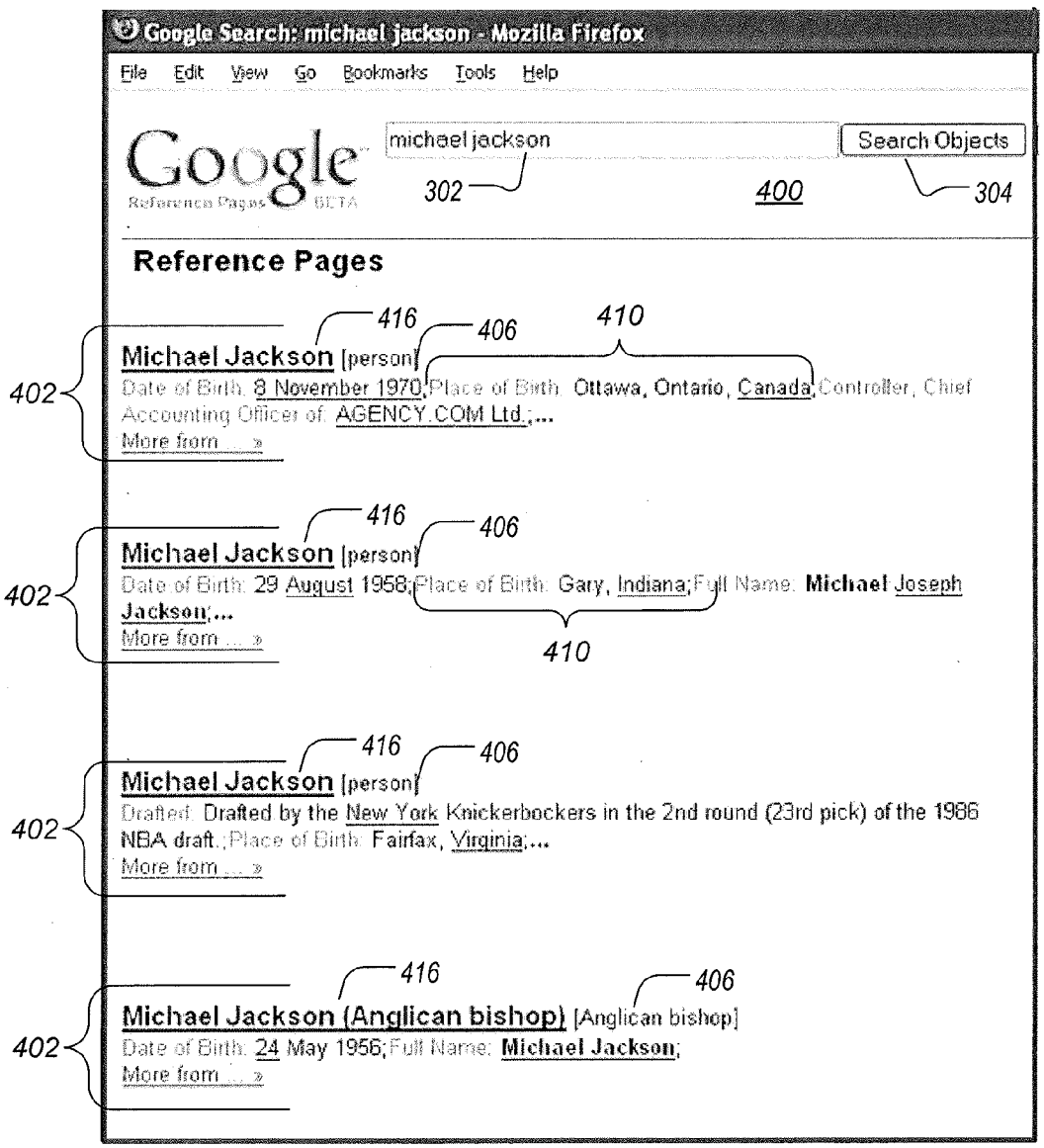
FIG. 4 illustrates a search results page for a search on the fact repository.

FIG. 4 illustrates the search result page 400 of a search, here for the search query "china." The results page 400 includes a list of ranked search results 402, each search result 402 comprising a name link 416 to an object, the anchor text of the link 416 being the name of the object (the name link 416 resolves to an object detail page, as further described below). The results 402 are ranked according to their relevance to the search query. Each search result 402 (which for the purpose of this discussion can also be referred to as an object) is displayed with a label 406 indicating the category of the object (e.g., country, company, person, car, etc.).

Displayed in conjunction with each search result 402 is a list of one or more facts 410 associated with the object. In this example, the results 402 are for a number of different people named "Michael Jackson". The list of facts 410 is ordered according to the relevance scores of the facts, so that the fact most relevance to the query are displayed first.

Selection of the name link 416 for an object search result 402 produces an object detail page 500 for the object, such as illustrated in FIG. 5. The object detail page 500 contains a list of the facts 510 associated with the object, each fact 510 including its attribute (e.g., "name," "category," "population," etc.) and its value. The facts 510 may be listed on a single detailed result page 500, or on several linked pages. The object detail page 500 can be presented as a table with fixed size columns, or a list. Facts 510 can be textual or graphical. Each fact 510 is also associated with a source link 512 to a source of the fact.

Included in any of the facts 510 are one or more object reference links 514. An object reference link 514 is link to object that is identified (e.g., by name) in the text of a fact. For example, in FIG. 5, in the "Wrote" fact 510c includes an object reference link 514 to "Thriller" which is another object in the fact repository 115. The object reference link 514 is not a hard coded link to the identified object. Instead, the object reference link 514 is a type of search link. In response to the user selecting the object reference link 514, a search query is passed to the service engine 114. The service engine 114 parses the search query and determines that is it is a query for objects based on specified attribute and values, rather than for keywords. Accordingly, the service engine 114 passes the search request to the service engine 114. The service engine 114 resolves the search by retrieving the objects match the search criteria.

Figure 6:
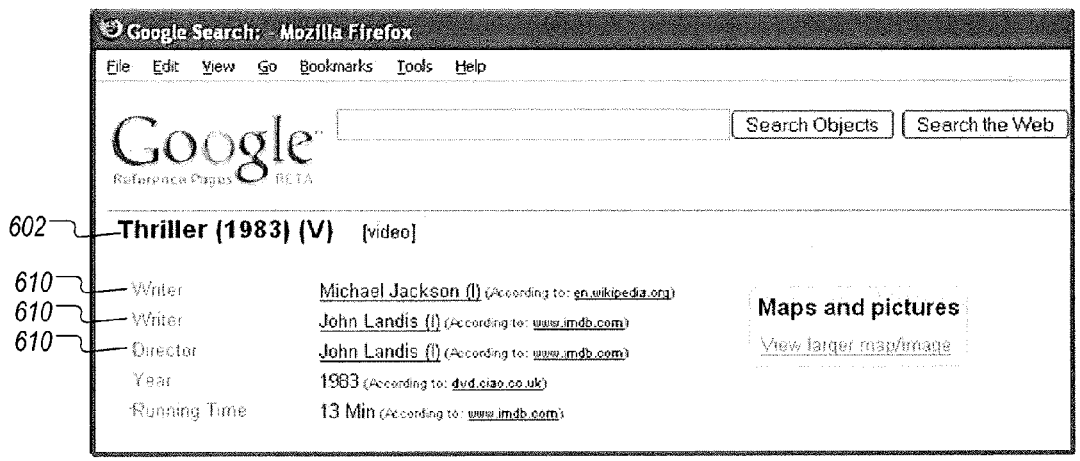
FIG. 6 illustrates another object detail page obtained in response to selection of the object reference link in FIG. 5.

FIG. 6 illustrates the results of the user activating the object reference link 514 in FIG. 5. Here, the results of the search by the service engine 114 returns the object "Thriller" along with its associated facts 610, such as its writers, director, year, and running time.

Generation of Object Reference Links

As illustrated above, any fact can include one or more object reference links. In one embodiment, the object reference links are generated by one of the janitors 110. In one embodiment, logic for generating the object reference links is follows (the implementation of course can be different, for improved efficiency).

A janitor 110 traverses the fact repository 115 and creates an objects names list comprising the name facts in the repository 115.

Next, the janitor 110 traverses over the value portions of the facts in the repository 115 (or any portion thereof). In the value of each traversed fact, the janitor determines whether the value contains one or more of the object names on the object names list. For each object name that is found the value of the fact, the janitor creates an object reference link in the fact value, using the object name as the anchor text for the object reference link. The created object reference link is in the form of a search query, rather than a hard coded link. The query comprises one or more search criteria, which restrict the search to objects having a name that matches the object name in the name fact.

In one embodiment, the search criteria are in the form of attribute-value pairs. Accordingly, the search criteria in this embodiment is an attribute-value pair, where the attribute indicates the name fact, and the value is the name string of name contained on the object names list. An example will further illustrate this relationship.

As illustrated in FIG. 5, the wrote fact 510c contained an object reference link 514 to the "Thriller (1983) (V)" object. The object reference link 514 comprises a search query of the form:

[attribute{name} value{"Thriller (1983) (V)"}].

This search query is then linked to the anchor text "Thriller (1983) (V)" in the value of fact 510c. It would be generated in the following manner.

Upon traversing the fact repository, the janitor 110 includes the name "Thriller (1983) (V)" in the object name list. This would of course be one of hundreds, thousands, or perhaps even millions of such object names collected during a traversal. Next, the janitor, in traversing over the fact values, traverse over the facts associated with the "Michael Jackson" object, and in each of those facts 510, processes the value portions to identify object names. In the "wrote" fact 510c, there is the string "Thriller (1983) (V), and thus the janitor 110 identifies the string value "Thriller (1983) (V)". This value is compared with the object name list, and a match is found to the "Thriller (1983) (V)" name contained therein. Accordingly, the janitor 110 creates the search query [attribute{name} value{"Thriller (1983) (V)"}] and links it to the "Thriller" string as the anchor text.

In a further embodiment, there is also the ability to trade off the precision of the search query link versus the scope of recall. This is done by including one or more additional search criteria within the query string. One implementation of this approach is including a second attribute-value pair in the search query, in which the attribute is the category fact, and the value is the value of the category fact for the object associated with the object name on the object name list. Thus, in the foregoing example, since the "Thriller" object has a category fact of "video", the second attribute-value pair included in the query for the object reference link 514 would be:

[attribute{category} value{video}].

To facilitate this refinement of the search query in the link 514, the category attribute and value is stored along with the object name in the object name list. This approach can be extended to include any number of additional attribute-value pairs in the search query, each one including a corresponding attribute and value from the object which is named on the object name list.

The use of search queries in the object reference links provides various advantages. Because the search query executes a general search on fact repository, it will return any new objects that are added to the fact repository after the original link was established in a previous pass by the janitor. This would not be possible if the object reference link were instead a fixed hard link to a specific, preselected fact or object.

The above process by which the janitor 110 collected object names and constructs search links in facts is preferably repeated on periodic basis, for example daily, weekly, or any other time period or schedule. This ensures that new facts entered in the interval between repetitions are processed both to include the new object names on the object name list (so that existing facts can now properly reference such new object names), and to ensure that objects named in the value of such new facts are linked to previously existing facts. Alternatively, the process can be repeated each time some number of new facts or objects are entered (or modified) in the fact repository 115. For example, the janitor 110 may be executed after each new fact (or object), after every 100, 1000, or other threshold number of new facts (or objects) are entered (or modified).

Repetition of the process on some basis is beneficial to ensure that newly entered facts are included in the list of object names, so that previously entered facts which may have had such object names present in their fact values but unlinked can have such new object reference links constructed to the newly entered facts. The janitor 110 can use any type of phrase identification algorithm to identify object names in the value portions of the facts. In one embodiment, a multi-term information gain algorithm is used to identify phrases as sequences of terms in which the probability of a given sequence significantly exceeds the joint probability of the individual terms in the sequence. An implementation of this approach first tokenizes the fact value into a set of probable phrases, and then for each probable phrase checks the phrase as against the object name list to determine if the phrase is an object name. The check against the object names list is facilitated by storing the object name list as a hash table and hashing a probable phrase into the table; if the hash collides, then the phrase is an object name.

The tokenization of the terms in the value of a fact into a set of probable phrases can be implemented as follows. Each phrase will have an information gain score that is based on its probability of occurrence and the probability of occurrence of its constituent terms. A term's probability is its frequency in the corpus, per 100,000,000 terms. If the actual probability of term is unknown, it is given a default probability of $1\times10-8$. For a sequence of terms to be considered a phrase, its probability must be higher than the joint probability of its individual terms, by a factor K, where K=10L and L is the length (number of terms) of the sequence. Thus, for a two-term sequence (L=2) to be considered a phrase, its actual probability must be at least K=102 times the joint probability of the individual phrases. For a three-term sequence (L=3) to be considered a phrase, its actual probability must be at least K=103 times the joint probability. A sequence is qualified as a phrase if its information gain satisfies this minimum ratio requirement. To facilitate rapid computation, the probabilities and scores are computed via their base 10 logarithms. Those of skill in the art can readily devise other information gain scoring algorithms.

A value of a fact then is tokenized by finding the phrases with the highest ratio of actual to expected probability. Any list traversal algorithm may be used to traverse the terms of a fact, form sequences of consecutive terms thereof, and test such sequences for being phrases using the information gain score, such as the one described above. Thus in one embodiment, sequences of terms are formed from the end (the last term) of the fact value, towards the beginning (first term), where the sequence increments in length from 1 to some number of terms. The maximum sequence length is the total number of terms between the sequence start and the first term in the value. Each such sequence is tested for its information gain score, and if the information gain is sufficient, it is deemed a phrase and memorized for later comparison against the object name list. Preferably, for each term position in the fact value, there is at most one phrase identified, being the phrase that begins at that term position that has the highest information gain. That is, if there are N terms in the fact value, there will be at most N phrases, each phrase associated with and beginning at corresponding term in the fact value. In practice, at least some of the terms of a fact value will not have any associated phrase.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer implemented method comprising:
   at a computer system including one or more processors and memory storing one or more programs, automatically, without user intervention:
   obtaining a list of fact values from a plurality of facts in a fact repository having a selected type of attribute, wherein the fact repository includes a plurality of facts, and each fact includes:
      (i) an attribute descriptive of the fact; and
      (ii) a value associated with the attribute, wherein the values include numbers, dates, and text;
   responsive to a search for a value included in the list of fact values:
      identifying, from the plurality of facts, a fact associated with the value; and
      formatting for display:
         (A) a search link associated with the fact in the fact repository, wherein the search link is a hyperlink that invokes performance of a search of the fact repository when selected by a user, and wherein the search link comprises a search query including search criteria that include the value, and the value is used as an anchor for the search link; and
         (B) information representing a source from which the fact was gathered.

2. The method of claim 1, wherein the source is external to the fact repository.

3. The method of claim 1, wherein the information representing the source includes a hyperlink to the source.

4. The method of claim 1, further comprising: formatting for display (C) a confidence value for the fact.

5. The method of claim 1, further comprising: formatting for display (D) an importance value for the fact, wherein the importance value indicates a degree of importance the fact carries in order to understand an entity described by the fact.

6. The method of claim 1, wherein the value represents a person, and further comprising: formatting for display values representing one or more other related persons.

7. The method of claim 1, further comprising: formatting for display: (i) an attribute descriptive of the facts, (ii) multiple values associated with the attribute, and (iii) a corresponding source for each value in the multiple values.

8. A system, comprising:
   a processor;
   memory; and
   one or more programs for execution by the processor, the one or more programs comprising instructions for, without user intervention:
   obtaining a list of fact values from a plurality of facts in a fact repository having a selected type of attribute, wherein the fact repository includes a plurality of facts, and each fact includes:
      (i) an attribute descriptive of the fact; and
      (ii) a value associated with the attribute, wherein the values include numbers, dates, and text;
   responsive to a search for a value included in the list of fact values:
      identifying, from the plurality of facts, a fact associated with the value; and
      formatting for display:
         (A) a search link associated with the fact in the fact repository, wherein the search link is a hyperlink that invokes performance of a search of the fact repository when selected by a user, and wherein the search link comprises a search query including search criteria that include the value, and the value is used as an anchor for the search link; and
         (B) information representing a source from which the fact was gathered.

9. The system of claim 8, wherein the source is external to the fact repository.

10. The system of claim 8, wherein the information representing the source includes a hyperlink to the source.

11. The system of claim 8, wherein the one or more programs further comprise instructions for: formatting for display (C) a confidence value for the fact.

12. The system of claim 8, wherein the one or more programs further comprise instructions for: formatting for display (D) an importance value for the fact, wherein the importance value indicates a degree of importance the fact carries in order to understand an entity described by the fact.

13. The system of claim 8, wherein the value represents a person, and wherein the one or more programs further comprise instructions for: formatting for display values representing one or more other related persons.

14. The system of claim 8, wherein the one or more programs further comprise instructions for: formatting for display: (i) an attribute descriptive of the facts, (ii) multiple values associated with the attribute, and (iii) a corresponding source for each value in the multiple values.

15. A non-transitory computer readable storage medium storing one or more programs configured to be executed by an electronic device that includes one or more processors, a video input, and a tuner, wherein the one or more programs comprise instructions for, without user intervention:
- obtaining a list of fact values from a plurality of facts in a fact repository having a selected type of attribute, wherein the fact repository includes a plurality of facts, and each fact includes:
  - (i) an attribute descriptive of the fact; and
  - (ii) a value associated with the attribute, wherein the values include numbers, dates, and text;
- responsive to a search for a value included in the list of fact values:
  - identifying, from the plurality of facts, a fact associated with the value; and
  - formatting for display:
    - (A) a search link associated with the fact in the fact repository, wherein the search link is a hyperlink that invokes performance of a search of the fact repository when selected by a user, and wherein the search link comprises a search query including search criteria that include the value, and the value is used as an anchor for the search link; and
    - (B) information representing a source from which the fact was gathered.

16. The non-transitory computer readable storage medium of claim 15, wherein the source is external to the fact repository.

17. The non-transitory computer readable storage medium of claim 15, wherein the one or more programs further comprise instructions for: formatting for display (C) a confidence value for the fact.

18. The non-transitory computer readable storage medium of claim 15, wherein the one or more programs further comprise instructions for: formatting for display (D) an importance value for the fact, wherein the importance value indicates a degree of importance the fact carries in order to understand an entity described by the fact.

19. The non-transitory computer readable storage medium of claim 15, wherein the value represents a person, and wherein the one or more programs further comprise instructions for: formatting for display values representing one or more other related persons.

20. The non-transitory computer readable storage medium of claim 15, wherein the one or more programs further comprise instructions for: formatting for display: (i) an attribute descriptive of the facts, (ii) multiple values associated with the attribute, and (iii) a corresponding source for each value in the multiple values.

* * * * *